Aug. 4, 1953 H. G. WEISS 2,647,994

AUTOMATIC FREQUENCY-CONTROL IN PULSE-TRANSMISSION SYSTEMS

Filed Dec. 4, 1943 2 Sheets-Sheet 1

Inventor
HERBERT G. WEISS

By [signature]

Attorney

Inventor
HERBERT G. WEISS
By [signature]
Attorney

Patented Aug. 4, 1953

2,647,994

UNITED STATES PATENT OFFICE 2,647,994

AUTOMATIC FREQUENCY CONTROL IN PULSE TRANSMISSION SYSTEMS

Herbert G. Weiss, Cambridge, Mass., assignor, by mesne assignments, to the United States of America as represented by the Secretary of the Navy Application December 4, 1943, Serial No. 512,926

24 Claims. (Cl. 250—20)

This invention relates to the automatic regulation of receiving apparatus adapted to receive signals of very high frequencies, such as frequencies above 2000 megacycles. More particularly the invention is concerned with the provision of automatic receiver control during the reception of signals of the recurrent short-pulse type, such signals being the usual form of signals received in radio-echo detection and location systems. The invention is especially concerned with automatic tuning controls, but the application of some of the circuits disclosed to automatic receiver gain control will also be pointed out.

It has been found difficult in the past to provide automatic frequency control and automatic gain control for receivers handling signals of the recurrent short-pulse type because of the extremely short duration of the signal pulses and because of the low average power of the signals over the recurrence frequency cycle. The need for automatic tuning control in short-pulse ultra-high-frequecy systems, however, is very great because changes in loading resulting from the antenna system scanning past nearby objects, etc., cause the transmitter frequency to vary the frequency sometimes varying as quickly as 200 or 300 mc./sec$^2$. For some applications, such as gun-directing, automatic gain control is very important in short-pulse systems, as more fully pointed out below. It is an object of this invention to provide effective automatic frequency control and automatic gain control operation upon short-pulse signals. It is a further object of the present invention to provide arrangement of apparatus such that when no signal is being received, the receiver will be automatically tuned back and forth over a suitable small range until a signal is again found, whereupon the receiver will automatically be tuned to said signal. Other objects of the invention will be apparent from the description of the circuits and apparatus in question.

The invention is illustrated in the annexed drawing in which.

In the following description of the drawings, various values of resistors, condensers and the like are indicated as being preferred, but it is to be understood that these are generally purely illustrative and do not indicate essential features of the invention. Likewise the showing of certain particular circuits and circuit features, such as by-pass condensers and the like, is not intended to exclude the use of other circuits equally known to the art for accomplishing the functions in question.

Figure 1:
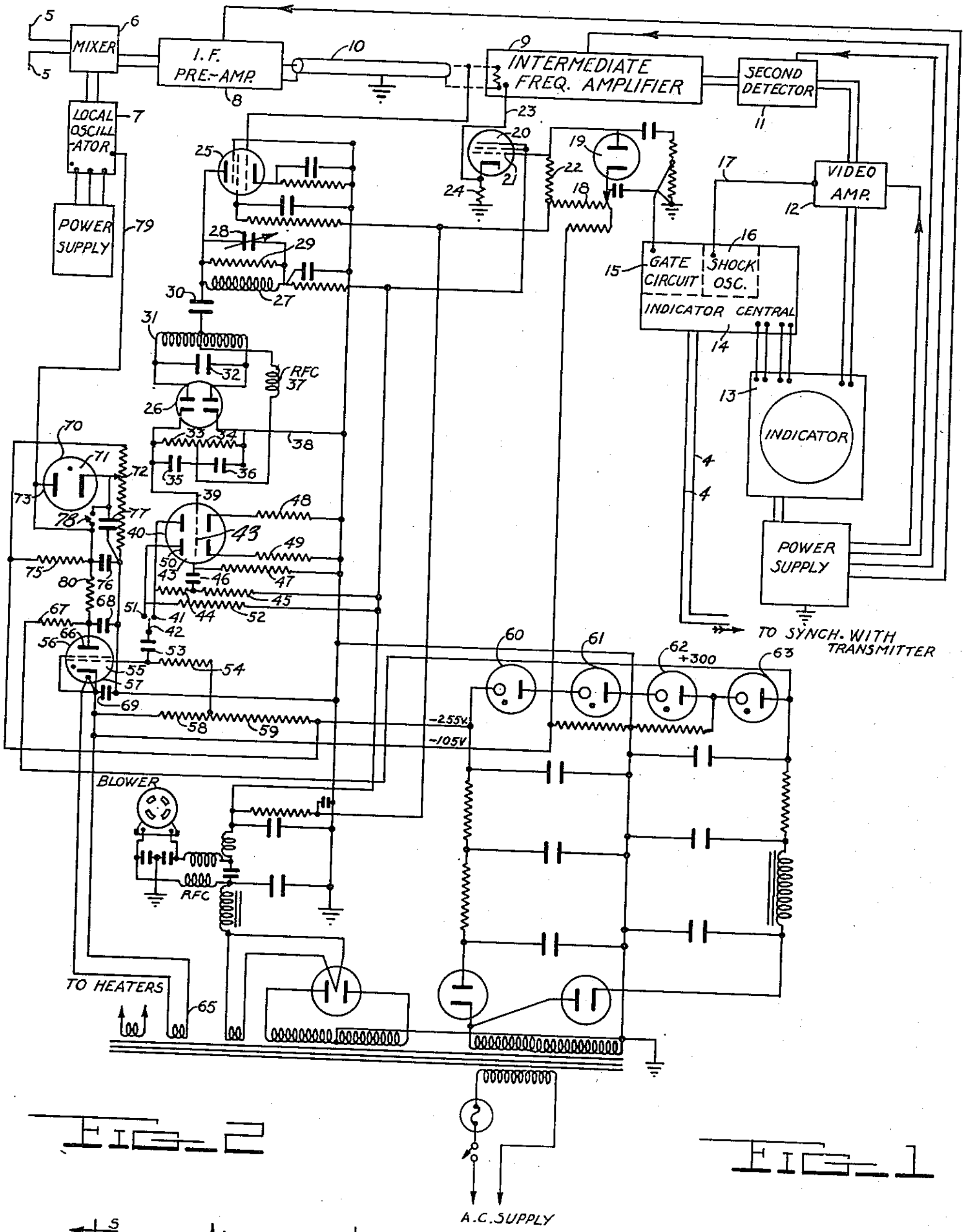
Fig. 1 shows a circuit diagram of a frequency control apparatus according to the present invention and the manner of its organization in a receiver system adapted for radio-echo detection in connection with short-pulse signals of very high radio frequencies.

Fig. 1 illustrates a receiver for signals of high radio frequency and of the recurrent short-pulse type, being illustrated in part after the manner of a block diagram and in part, especially as concerns the automatic tuing control, in an electric circuit diagram. The antenna appears at the upper left at 5 and is connected to a mixer 6, which in the usual case is a crystal detector, with or without a tuned resonator. Between the antenna 5 and the mixer 6 may be provided the necessary joints, branch line and protective devices for permitting the use of the antenna 5 for transmitting as well as for receiving, without undesired overload of the mixer 6. The mixer 6 operates upon the heterodyne detection principle and is connected with a local oscillator 7 the frequency of which is slightly different, by a predetermined amount, from the signal received by the antenna 5, so that in the mixer 6 a beat frequency signal is produced which may be amplified by the intermediate-frequency amplifiers 8 and 9 to which the output of the mixer 6 is connected. The local oscillator 7 is preferably an oscillator employing an oscillator tube of the velocity modulation type which is tunable in frequency by the variation of the voltage of an electrode. Such tubes generally comprise a single toroidal cavity resonator axially pierced to permit the passage of an electron beam, a structure adapted to form an electron beam and to project it axially through the said cavity, and a reflector on the other side of said cavity from the said structure adapted to cause electrons of said beams to reverse their direction of motion and pass again through the said cavity. Tubes of this type are particularly convenient for local oscillator use in automatically tuned receivers because the frequency of oscillation can be conveniently varied by varying the voltage of the reflector electrode with respect to the cathode of the tube.

The intermediate-frequency amplification is, for reasons of convenience, provided in two separate pieces of apparatus connected by a transmission line 10 which preferably has a low characteristic impedance. Thus the amplifier 8 may be located in the immediate neighborhood of the mixer apparatus 6, while the amplifier 9 may be located at the receiving position in the neighborhood of the associated apparatus and controls. The amplifier 9 feeds a second detector 11 which serves to rectify the intermediate-frequency signal and thereby to convert it into a video-frequency signal. The second detector may be one of the well-known triode or diode circuits. If a diode type of circuit is employed the power supply connection shown on Fig. 1 will accordingly be omitted. The second detector stage 11 feeds a video-frequency amplifier 12 which in turn provides a signal tube and indicator apparatus 13 which, in the usual case, includes one or more luminous screen indicator tube of the cathode ray type. The deflector circuits of the indicator apparatus 13 are controlled by an indicator central apparatus 14 which is substantially an electronic timing device of more or less complicated form. The indicator central apparatus 14 is connected by wires 4 to the transmitter (not shown) of the radio-echo detection system for the purpose of synchronizing the timing circuits of the indicator central with the operation of the transmitter. Among its many various timing circuits, the indicator central apparatus 14 includes a gate circuit, indicated in a general manner at 15, and a calibrating circuit, indicated in a general manner at 16. The gate circuit is preferably provided with a switch to put it into or out of operation. It is designed to provide voltage pulses of a desired duration beginning at a predetermined time after the transmitter has ceased radiating a pulse signal, the pulse provided by the gate circuit being such as to permit energization of the intermediate-frequency amplifier 9 for a selective portion of the duty cycle of the transmitter between transmitted pulses.

The calibration circuit 16 is preferably one of the "shocked crystal oscillator" type in which an oscillating circuit including a piezo-electric crystal is set into oscillation by a suitably timed pulse and the resulting electric oscillations are passed through circuits adapted to transform them into a series of transient impulses separated by the reasonant period of the piezo-electric crystal circuit. The said series of impulses is fed to the video amplifier 12 by means of the wire 17 and in consequence appear on the indicator 13 together with the indication of the signal, thus providing a calibration of the time delay between the timing pulse operating the calibration circuit 16 and the signal received in the receiver.

A manually operated gain control is provided for the receiver by the potentiometer 18. This potentiometer adjusts the bias of the diode vacuum tube 19, which in turn determines the normal control grid voltage of the vacuum tube 20. The control grid 21 of the vacuum tube 20 is connected to a positive voltage of, say, about 105 volts, through a resistor 22 which has a very high resistance, such as about 10 megohms, so that the bias of the tube 19 will normally be completely determinative of the grid voltage of the tube 20. When the gate circuit 15 is in operation, however, the diode 19 and its associated resistors and conductors operates as a "D. C. level-setting" circuit, permitting the normal voltage of the grid 21 to exist during the positive portion of the gate pulses, but impressing a much more negative voltage upon the grid 21 during the negative portion of the gate cycle, thereby substantially cutting off the tube 20 during such negative portions. The tube 20 determines the plate and screen voltage applied to the first two stages of the intermediate frequency amplifier 9 through the wire 23, thereby controlling the gain of the amplifier 9. The plate of the tube 20 is connected to a positive voltage such as about 250 volts. The voltage drop in the resistor 24 between the cathode of the tube 20 and ground, which resistor preferably has a value of about 25,000 ohms, is the voltage applied through the wire 23 to the intermediate frequency amplifier.

The foregoing description illustrates a typical functional environment in which apparatus of the present invention finds utility. The circuit of Fig. 1 with which the present invention is concerned may now be explained.

Part of the intermediate-frequency signal passing through the transmission line 10 is applied to the grid of an amplifier tube 25, such grid being thus effectively in parallel with the input of the amplifier 9. Since at this point the signal is associated with a low impedance circuit it is convenient to take the portion of the signal destined to operate the automatic frequency control apparatus from this part of the system. Moreover, the overall bandwidth of the amplifier 8 is considerably greater than that of the amplifiers 8 and 9 together, which is advantageous for the operation of the frequency control circuits.

The amplifying stage including the tube 25 is coupled to a discriminator circuit which includes the double diode vacuum tube 26. The coupling means includes a tuned circuit in the plate circuit of the tube 25 which comprises the coil 27, the condenser 28 and a loading resistor 29 which may conveniently have a value of about 5000 ohms. A coupling condenser 30 preferably of a magnitude of about 25 micro-micro-farad, connects the said tuned circuit to the center point of a balanced tuned circuit which includes the center-tapped coil 31 and the condenser 32. The discriminator circuit is of the Foster-Seeley type, operating on the phase difference beween coupled tuned circuits as described in Proceedings of the Institute of Radio Engineers, vol. 25, page 289 (1937). Accordingly, opposite ends of the coil 31 are connected to the plates of the vacuum tube 26 and the cathodes of the said vacuum tube are connected to opposite ends of a resistance-capacitance network comprising the resistors 33 and 34 and the condensers 35 and 36. The mid-point of the said resistance-capacitance network is, as shown on Fig. 1, connected through a radio-frequency choke 37 to the mid-point of the coil 31. The resistors 33 and 34 are preferably about 10,000 ohms each. The condenser 35 should be larger than the condenser 36 and preferably the condenser 35 has a value of about 50 micro-micro-farad, while the condenser 36 has a value of about 25 micro-micro-farad. The difference arises from the fact that there are certain other capacitances effectively in parallel with the condenser 36 which must be taken account of if balanced I. F. and video by-passing is to be obtained. The cathode of the tube 26 which is connected to the resistor 34 and to the condenser 36 is connected to ground through the wire 38, while the other cathode of the tube 26 is connected to the grid 39 of the vacuum tube 40. In the circuit shown in Fig. 1 the vacuum tube 40 combines two triode structures in a single vacuum-maintaining envelope.

The discriminator circuit operates to provide an output the amplitude of which varies with the frequency of the input signal. The manner in which the discriminator output voltage is utilized will be explained by reference to Fig. 2 after the circuits following the discriminator have been described.

The output of the first section of the vacuum tube 40 is connected to one contact 41 of a two-position switch 42. This output is also connected to the grid 43 of the second section of the vacuum tube 40, through a voltage dividing network comprising the resistors 44 and 45 and the coupling condenser 46. A grid leak resistor 47 is also provided. The resistors 44 and 45 are preferably of a magnitude of 10,000 ohms and 2000 ohms respectively. The cathode bias resistors 48 and 49 are preferably unbypassed. The anode 50 of the second triode section of the vacuum tube 40 is connected to a second contact 51 of the switch 42 and a suitable load resistor 52 is provided in the said anode circuit. Because of the well-known phase shift occurring in a single stage vacuum tube amplifier, the output voltage of the circuit of the anode 50 will have opposite polarity (180° phase shift) with reference to the polarity and phase of the output of the first triode section of the tube 40. Thus the two-position switch 42 is able to select either of two oppositely polarized signals. The purpose of the arrangement for selecting the polarity of the amplified discriminator output will be explained in connection with Fig. 2 after the function of the circuits operated by the discriminator output has been made clear.

Figure 4:
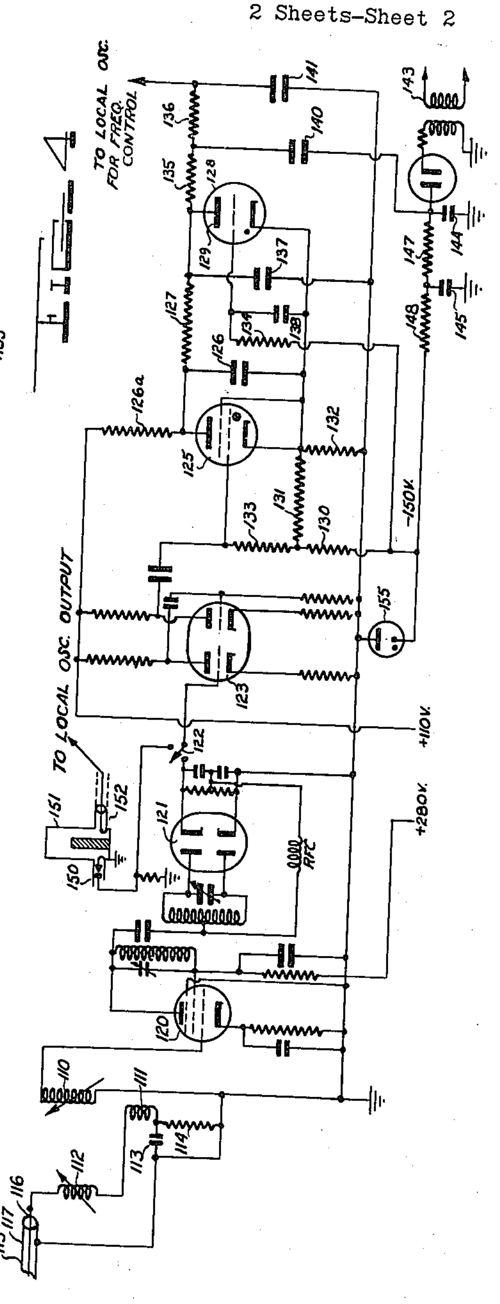
Fig. 4 shows still another form of apparatus for controlling the tuning of a receiver in accordance with the present invention.

It is to be understood that the amplifying circuits connected with the vacuum tube 40 are designed to amplify alternating current potentials and not "D. C." potentials. The output of the discriminator will be intermittent, in the form of a series of pulses corresponding to the pulses of intermediate-frequency energy amplified by the amplifier 8, so that the said output of the discriminator may be regarded as an alternating current. Where it is desired to control the receiver by reference to an unmodulated wave, in order to operate the circuits of the present invention it is necessary to introduce some modulation onto the wave in question in order to obtain the desired control. An arrangement in which such modulation is effected is shown in Fig. 4.

The output of the vacuum tube amplifier 40, as selected with respect to polarity by the switch 42, is coupled to the control grid 55 of a gas discharge tube 56, through a coupling condenser 53, a grid leak resistor 54 (preferably of a value of about 50,000 ohms) being also connected in the circuit as shown on Fig. 1. A negative bias, preferably of the order of —255 volts, is impressed upon the grid 55 of the discharge tube 56 through the grid circuit resistors 58 and 59 which preferably have values of 5,000 ohms and 100,000 ohms respectively. The resistors 58 and 59 act as a voltage dividing network so that the normal bias of the grid 55 is not as greatly negative as —255 volts. The cathode 57 of the discharge tube 56 is maintained at a negative bias of preferably —105 volts. The negative bias voltages, in order that they may be relatively constant, are preferably provided by a voltage-regulated power supply, the voltage-regulation elements comprising the gas discharge tubes 60 and 61. The plate voltage of the tube 56 should likewise be relatively constant, so that it also is preferably derived from a power supply the output voltage of which is regulated by gas discharge tubes, in this case the gas discharge tubes 62 and 63.

Because of the considerable negative bias impressed upon the cathode of the gas discharge tube 56 the heater voltage and current necessary for the operation of the said tube should be obtained from a filament transformer winding 65 which is independent of the filament voltage supply for the other tubes of the control circuits, the cathodes of which operate relatively close to ground potential.

The gas tube 56 is preferably of the type 2050, although other gas tube types may be used. A relatively high plate voltage, for instance about 300 volts, is applied to the plate 66 of the tube 56 through the plate load resistor 67, which is preferably of a value of about 500,000 ohms. A condenser 68 is connected between the plate 56 and ground, such condenser being preferably of a magnitude of about .01 micro-farad. The cathode 57 is bypassed to ground through the condenser 69 which should be substantially larger than the condenser 68 and is preferably about .25 micro-farad in magnitude. In consequence the condenser 68 may be regarded as interposed between the anode 66 and the cathode 57.

The signal pulses received and amplified in the receiver will generally be pulses of extremely short duration separated by a relatively large interval, such for instance, as pulses of one microsecond duration separated by an interval of 500 or 1000 microseconds. Pulses of such short duration separated by such long intervals are not well suited for operating frequency control circuits. The circuit of the discharge tube 56 is adapted to be operated by pulses even of extremely short duration to cause a considerable change in the plate circuit, but since the effect in the plate circuit of the tube 56 does not depend upon the length of the input pulses, within limits, or upon the intensity thereof (except as to whether the input pulses exceed a predetermined voltage level), the circuit of a tube 56 is not strictly an amplifier. For want of a better term, however, this circuit may be referred to as a "pulse-lengthening" amplifier, because each short pulse in the grid circuit produces a train of events in the plate circuit the duration of which in time is much greater than the original pulse length in the grid circuit. The wave form produced in the plate circuit is quite different from that of a rectangular pulse, but it may be spoken of generally as a pulse, thus justifying the terminology above suggested.

When the short pulses coupled to the control grid 55 reach sufficient amplitude to overcome the bias of the said control grid, the tube 56 is put into conducting condition and the grid 55 loses control. The condenser 68 will then tend to discharge and at the same time current flowing through the plate load resistor 67 will reduce the voltage of the plate 66 because of the voltage drop in the said resistor. In consequence of the discharge of the condenser 68 and the effect of the resistance 67, the plate 66 will, after a period depending upon the capacitance of the condenser 68 and the resistance of the resistor 67, fall to a value sufficiently low to allow the grid 55 to resume control. I prefer to provide the condenser 68 and the resistor 67 with such values of capacitance and resistance respectively that the tube 56 remains conducting for approximately 30 microseconds, although the circuits of the present invention may be operated also with other conducting period lengths. By the time the anode 66 has reached the range of values where the grid can be expected to take control again, the grid has returned to its normal bias value, so that the tube 56 will be kept in non-conducting condition until the next pulse is received from the amplifier tube 40.

When the tube 56 fires and the condenser 68 discharges through it, the anode 66 is brought to substantially the potential of the cathode 57. Thus the firing of the tube 56 brings about a sharp drop in the anode potential. When the tube 56 is extinguished after the discharge of the condenser 68, the anode voltage will rise as the condenser 68 is charged through the resistor 67 in the exponential manner characteristic of a condenser charging through resistance. By the time the next pulse comes along and fires the tube 56 (assuming that it is of sufficient intensity to do so) the anode voltage will have again risen, although not usually to its original value (the time constant of the resistor-condenser circuit is usually made so that the anode voltage does not climb more than half way back to the original value during the period of pulse repetition, so that when the tube 56 fires upon a series of successive pulses the average voltage of the anode 66 (as averaged over the pulse repetition cycle) will be a great deal less than the anode voltage under quiescent conditions. The difference may, for instance, amount to as much as several hundred volts.

The circuit of the tube 56 in a certain sense "lengthening" the pulse signals provides a form of amplification of which pulse signals are peculiarly susceptible, corresponding in effect to a great deal of ordinary amplitude amplification which is difficult to perform upon short pulses. With this gain in sensitivity, however, smoothness of control is lost because the anode voltage as averaged over the pulse repetition cycle tends to pass quickly back and forth between two stable values according as to whether the pulses are or are not capable of firing the tube 56. The intermediate situation in which variation in intensity of signal pulses might cause the tube 56 to fire on some but not all of a sequence of pulses covers only a narrow range of average pulse input voltage. In order to make up for the loss of smoothness of control, the plate circuit of tube 56 is made to work for the gradual charging of condenser 76 through resistors 67 and 80. Lowering of the anode voltage of tube 56 as a consequence of operation of such tube as aforesaid will tend to lower the voltage of the left-hand plate of condenser 76, and will lower it considerably if the discharge of condenser 68 is repeated for a number of successive signal pulses. Resistor 80 has a relatively high value, say about one megohm, so that the short-period variations (i. e. within the pulse repetition period) are smoothed out to some extent, while the changes in average voltage (averaged over the pulse repetition period) are effectively passed on.

Thus the gradual change of potential of the left-hand plate of condenser 76 towards more positive voltage and the counter-action of this change by the firing of tube 56 as controlled by a signal will permit satisfactory tuning control, with some "hunting" but not very much of it, when the voltage of the left-hand plate of condenser 76 is used as the control voltage on the local oscillator 7 as shown in Fig. 1. The "hunting" effect is small in amplitude and has a very short period, short enough to follow rapid changes in transmitter frequency. In order to prevent the left-hand plate of condenser 76 from going to excessively positive voltages, gas tube 70 is provided which will fire when the voltage rises to a predetermined value and return the control voltage to a much lower voltage from which a new rise may then begin. The resistor 75 also serves to prevent excessive rise of this voltage, which is particularly important in case the gas tube 70 should fail or be removed. The range of voltage variation permitted by tube 70 will depend on the tube characteristic, and the absolute value of the voltage extremes will be determined by the values of voltages applied to the circuits associated with tubes 56 and 70.

The tube 70 is also intended to serve another purpose, which is of primary importance: to cause the receiver to "search" when no signals are being received. In the absence of signals the repeated ignition of the tube 70 will cause the receiver to be tuned repeatedly across a range of frequencies, slowly in one direction and suddenly in the other. When a signal is encountered on the slow part of one of these "saw-tooth" tuning sweeps, the tube 56 will come into operation and the receiver will be tuned to the signal. When the signal is lost, the receiver will again "search" for a signal. This type of operation is highly desired in microwave locating equipment.

The gas tube 70 may conveniently be a diode such as the type OA4G, although triode tubes such as the 884 may also be used, as explained in connection with Fig. 4. Certain gas diodes, such as those used for voltage-regulation service are not particularly practical because their ignition and extinction voltages lie too close together, so that the effective variation in tuning that could be accomplished by the oscillation of such a diode would not be a sufficiently wide variation. With a type OA4G diode, producing a voltage wave with an amplitude of about 40 volts however, a variation of the order of 2 per cent of the local oscillator frequency may be accomplished with oscillator tubes now in use. The cathode 71 of the gas tube 70 is connected to a negative bias adjustable by means of the potentiometer 72, the bias voltage being derived from the regulated power supply. The anode is connected to the anode 66 of the tube 56 through a high resistance 80, preferably of the value of 1 megohm. A resistor 75, having also a value of about 1 megohm, may also be provided, if desired. Such resistor acts as part of a voltage-divider network in conjunction with resistors 67 and 80 and, when connected to a negative bias voltage as shown, tends to bring the region of control to a more negative voltage level, the reference being to the voltage of the lead 79 which connects with the frequency-control electrode of the local oscillator. As above pointed out, resistor 75 also serves to prevent the voltage of the lead 79 from rising to excessively positive voltages in case the tube 70 should fail to function or should be removed, thereby, serving to protect the local oscillator from possible damage. A condenser of relatively large capacitance, such as about 0.5 micro-farad, shown in Fig. 1 at 76, is connected between the anode 73 and ground so that this condenser will be charged while the tube 70 is conducting. The cathode 71 is bypassed to ground by means of the condenser 77 (which may conveniently have a value of about 0.50 micro-farad) so that when the tube 70 suddenly becomes conducting the condenser 76 will charge rapidly.

A switch 78 is provided between the anode 73 and the cathode 71 which is adapted when closed to short-circuit the gas tube 70 and to maintain the anode 73 at a negative voltage with respect to ground determined by the potentiometer 72 and independent of the state of the control circuits. The reflector electrode of the local oscillator 7 is connected to the anode 73 by means of the wire 79, so that when the switch 78 is closed all the influence of the control circuit is eliminated from the reflector voltage and the receiver may then be operated without any automatic tuning. When automatic tuning is desired the switch 78 is opened.

When the switch 78 is opened and when the tube 56 is in a substantially continuous non-conducting state (i. e. when no pulses are being delivered by the amplifier 48 which are of sufficient amplitude to cause the tube 56 to fire), the gas tube 70 and its associated circuit produces a series of oscillations in which the condenser 76 alternately rapidly charges (to a negative voltage) and slowly discharges, thus acting as a relaxation oscillator and causing a voltage wave of saw-tooth form to be impressed on the wire 79. This voltage wave causes the local oscillator to tune slowly across a certain band of frequencies, then to return rapidly to the starting point and tune again across the said band of frequencies, and so on (the frequency decreasing slowly and then almost instantaneously increasing to the initial value).

The circuit of the gas tube 70 is, however, affected by the operation of the gas tube 56, for when pulses are amplified by the vacuum tube 48 which when impressed upon the control grid 55 are sufficient to cause the tube 56 to fire, the anode will for a predetermined period set by the condenser 68 and the resistor 67 (about 30 microseconds, for instance) be at a potential substantially equal to that of the cathode 57 (about −105 v.) and the average voltage of the anode 58 as average over the pulse repetition period will drop as above explained. Thus the firing of the tube 56 will interfere with and delay the discharge of the condenser 76 and the constants of the circuit 67, 68 are so chosen that when the tube 56 fires on a considerable succession of pulses, the anode 73 is not only wholly prevented from reaching a voltage sufficiently less negative than the cathode 71 to ignite the tube 70, but its voltage is actually lowered (the process being "smoothed" by the effect of the resistor 80). When a signal is being received, therefore, the voltage of the anode 73 (and consequently also the frequency of the local oscillator and the tuning of the receiver) is fully under the control of the tube 56 and the circuits associated therewith, the oscillations of the tube 70 being halted. For a circuit arranged as in Fig. 1 with the values of voltage, resistance and capacitance as above suggested a voltage swing of ±20 volts of the anode 73 about a value of approximately −100 volts (set by the potentiometer 72), during quiescence of the circuits of the tube 56, the period of the oscillations of the tube 70 is about 0.5 second and the period of conduction of the tube 56, which is about 30 microseconds, is sufficient, at a pulse repetition rate of 400 per second for instance, for complete control of the voltage of the anode 73 and interruption of the oscillations of the tube 70. The anode circuit of the tube 56 should be designed so that the change of the average voltage, averaged over the pulse repetition rate, induced by firing of the tube 56 is sufficient not only to overcome the tendency of the left-hand plate of condenser 76 to rise in voltage but also to cause the voltage of said plate to become more negative.

Automatic frequency control circuits in common use previous to this invention usually provided for a change of frequency in one direction operated by a positive output of the discriminator circuit and change of frequency in the other direction operated by negative output of the discriminator circuit. In the circuit of the present invention, change of receiver tuning in one direction is provided by the charging of the condenser 76 (which in the absence of a received signal is made intermittent by the oscillations of the tube 70) and change of tuning in the opposite direction is effected by the circuit of the tube 56 which operates in response to the output of the discriminator circuit. The tube 56 operates only upon positive pulses delivered to its grid 55. If it were desired to control the frequency of the local oscillator in both directions by circuits of the type of that of the tube 56, two such tubes would have to be provided, one connected to the contact 51 and the other connected to the contact 41 with their plate circuits acting oppositely to each other.

Figure 2:
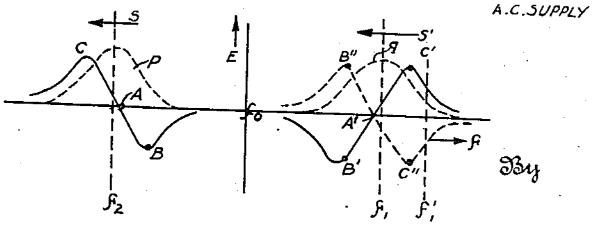
Fig. 2 is a graph illustrating the operation of part of the circuits of Fig. 1.

In the arrangement of Fig. 1, as has been pointed out above, the amplitude of the pulses provided to the grid 55 is determined by operation of the discriminator circuit. The operation of the discriminator circuit may be illustrated by the diagram of Fig. 2. Fig. 2 is a plot of discriminator output voltage against signal frequency, the latter being indicated by the horizontal axis. The frequency $f_0$ in the middle of the plot represents the frequency of the signal at which it is desired to adjust the receiver tuning. The frequencies $f_1$ and $f_2$ are the local oscillator frequencies suitable for bringing the detected intermediate-frequency signal exactly in the middle of the pass band of the amplifiers 8 and 9 (i. e. for the desired tuning of the receiver). The frequency $f_1$ is higher than the frequency $f_0$ by the midband frequency of the intermediate-frequency amplifiers 8 and 9 and the frequency $f_2$ is smaller than the frequency $f_0$ by the same amount. Receivers of the type shown in Fig. 1 employing a mixer circuit incorporating a crystal rectifier usually have little, if any, "image rejection," so that for a given local oscillator frequency two signal frequencies are possible to which the receiver is substantially equally sensitive, and for a given signal two local oscillator frequencies are possible without substantial difference therebetween in receiver sensitivity. It will presently be seen that it is desirable to adjust the local oscillator so that only one of the two possible local oscillator frequencies come into question (it being understood that in radio-echo detection systems the signal is usually the reflection from a distant object of a locally generated oscillation the approximate frequency of which is known). In many types of apparatus, however, it is difficult to set the local oscillator with precision on one side or the other of the desired signal so that the possibility of operation on either side of the desired signal must be contemplated.

In order to provide for the receiver automatically setting itself upon a signal after the local oscillator has been set at a frequency not greatly different from the desired local oscillator frequency but not necessarily close enough thereto to provide for the signal falling within the pass band of the receiver, which pass band is indicated in Fig. 2 by dotted lines $p$ and $q$, the local oscillator is made to "search" by having its frequency periodically varied over a frequency range which is large compared to the pass band of the receiver, for instance, about twelve times the pass band width (measured at half power) of the amplifier 8. As previously explained, the searching operation is accomplished by means of the oscillation of the circuit including the gas tube 70 which impresses a voltage wave of saw-tooth form upon the frequency control electrode of the local oscillator 7. Since the said voltage wave is a saw-tooth type of wave gradually rising in voltage from a negative value to a more positive value and then suddenly falling in voltage, and since with local oscillator tubes commonly used such a variation in the frequency sensitive electrode voltage results in a frequency variation consisting of alternate gradual decreases in frequency and sudden increases in frequency, the discriminator circuit will take effect, as an inspection of the circuit will show, upon the gradual decrease of local oscillator frequency when such decrease of frequency carries the local oscillator tuning to a frequency for which the discriminator output is positive (as "seen" from the grid 55 of the tube 56), whereupon the tube 56 will fire thereby preventing the condenser 76 from discharging and, upon several firing cycles of the tube 56, even increasing the negative charge of the condenser 76 by a small amount. As a result, the oscillations of the tube 70 will be interrupted and the voltage of the anode 73 will be controlled by the circuit of the tube 56 so long as the signal continues to be received in the amplifier 8.

The solid curve appearing in Fig. 2 represents the voltage output characteristic of the discriminator circuit including the tube 26, which is the video-frequency voltage output appearing across the resistors 33 and 34. The output characteristic would normally be plotted against the frequency actually present in the discriminator input circuit, but in order that the discriminator characteristic may be related to the receiver tuning, the output is plotted in Fig. 2 against local oscillator frequency. Thus, on the plot of Fig. 2 the discriminator characteristic will have two critical regions, one in the neighborhood of each of the suitable local oscillator frequencies for receiving the signal in question. The discriminator input circuit is tuned to resonance ("cross-over" frequency) for a frequency practically equal to the midband frequency of the amplifier 8, which corresponds on the plot of Fig. 2 to two frequencies practically equal respectively to $f_1$ and $f_2$ and indicated by the points A and A'. Where the apparatus in question is designed to operate both with the local oscillator at a frequency higher than the signal and with the local oscillator at a frequency lower than that of the signal, the frequencies shown by the points A and A' should be made exactly equal to $f_1$ and $f_2$. If the receiver apparatus is designed to operate most of the time with the local oscillator on a particular side of the signal frequency, the tuning of the discriminator circuit may be adjusted so that the "cross-over" frequency is slightly different (as shown in Fig. 2) from the midband frequency of the amplifier 8, the direction of the change in frequency being determined by whether it is desired to operate the receiver with the local oscillator at a higher frequency than the signal or with the local oscillator at a lower frequency than the signal, and the amount of the said change in frequency being determined by the discriminator output amplitude necessary to begin to bring the gas tube 56 into operation. The particular curve of Fig. 2 represents the discriminator characteristics of an apparatus designed for operation with the local oscillator frequency lower than that of the signal, although it will be shown that in case of accidental setting of the local oscillator frequency on the other side of the signal frequency, satisfactory results may also be obtained by changing the setting of the switch 42.

The discriminator circuit is preferably designed so that the central part of the output characteristic, corresponding to the region CB shown in Fig. 2 will cover a range of frequencies approximately equal to the pass-band of the amplifier 8 as measured at half-power. Although a steeper discriminator characteristic could be used, the broad type of characteristic is preferable because it extends over a sufficient frequency spectrum to be sure of including the entire spectrum of the signal. Actually, the effect of amplifier stages following the discriminator will be to provide the equivalent of a very steep characteristic near the crossover while still providing full response at such frequencies as indicated at B and C of Fig. 2. The oscillator is tuned so that when it is subjected to the frequency variation caused by the oscillations of the tube 70 in the absence of a signal, it will at some point in the cycle of frequency variations pass the desired local oscillator frequency for bringing the intermediate frequency signal detected in the mixer and amplified in the amplifier 8 at a frequency in the middle of the band of the amplifier 8. The direction of the tuning sweep produced by the gradual part of the saw-tooth wave generated by the tube 70 is indicated on Fig. 2 by the arrows S and S'. When a signal is detected in the mixer 6, as the local oscillator frequency gradually sweeps from a frequency higher than $f_2$ towards a lower frequency, the intermediate frequency signal makes a corresponding change in frequency, first coming within the pass-band of the intermediate frequency amplifier 8 and then approaching the center thereof. It will be seen from the curve CAB of Fig. 2 that as the frequency of the local oscillator is brought to a value corresponding to the point A, the discriminator output will become positive and a point will be reached slightly beyond A where this output is sufficient to operate the gas tube 56 (assuming for the moment that positive polarity of discriminator output corresponds with positive pulse input on the grid 55). In consequence of the operation of the tube 56, the discharge of the condenser 76 will be brought to a halt and the left-hand plate thereof will be maintained at or near a relatively constant voltage by the operation of the above-described circuits, such voltage corresponding to a local oscillator frequency of the frequency $f_2$. If the signal frequency should decrease, the discriminator output would increase so that a greater number of igniting operations of the tube 56 will be necessary to bring the local oscillator to a frequency such that the discriminator output again falls below the level necessary to cause the tube 56 to fire. By such action of the tube 56, the local oscillator is changed in frequency to bring the detected signal back to the center of the pass-band of the amplifier 8. If the frequency of the signal should increase, the tube 56 will cease firing, thereby allowing the condenser 76 to discharge slightly, which in turn will change the local oscillator frequency to bring the detected signal in the intermediate frequency amplifier back to the midband frequency.

With the assumption that the polarity of the discriminator characteristic corresponds with the corresponding polarity of the input characteristic for the tube 56, let it be supposed that the local oscillator is, by accident or otherwise, adjusted so that the frequency range of the tuning sweep imposed by the operation of the tube 70 does not include the frequency $f_2$ but does include the frequency $f_1$. The corresponding plot of the discriminator output against local oscillator frequency will then be shown by the curve B'A'C'. As the local oscillator frequency is tuned toward lower frequencies by the operation of the tube 70, the discriminator will produce a positive output for frequencies higher than those represented by the point A' including frequencies higher than those represented by C'. The discriminator output will be sufficient to activate the tube 56 as sood as the combined effect of the amplifier sensitivity curve (shown by the dotted line $q$) and the discriminator output characteristic causes the signal pulses to reach a sufficiently high level. This may take place for a frequency indicated by $f_1'$. The operation of the tube 56 will then tend to keep the frequency of the local oscillator centered approximately on the frequency $f_1'$, and since the frequency $f_1'$, instead of being near the center of the pass-band of the amplifier 8 is considerably to one side thereof, perhaps even beyond the half-power point, as shown in Fig. 2, reception under such conditions will probably be extremely poor. If, however, the polarity of the output of the discriminator is reversed, the characteristic will appear as shown by the dashed line B[11]C[11]. When the polarity is thus reversed, as may be done by the operation of the switch 42, the local oscillator may then be controlled automatically to cause it to maintain a frequency very close to $f_1$ when a signal of frequency $f_0$ is being received.

If the frequency at which the oscillator is automatically set when operating lower than the frequency $f_0$ is made to fall at $f_2$ by displacing the point A slightly toward higher frequencies than $f_2$, the point A' will be so displaced as to put the frequency at which the local oscillator is set by the operation of the control circuit in accordance with the curve B''C'' slightly off the center of the pass-band of the intermediate frequency amplifier. This offsetting from the center is usually negligible, however, having been exaggerated for purposes of illustration in Fig. 2. If it is desired to provide theoretically perfect centering of the detected signal in the intermediate frequency amplifier pass-band for both types of operation of the local oscillator, the point A should be made to coincide with $f_2$, whereupon A' will coincide with $f_1$. The effective steepness of the discriminator characteristic which results from the folowing amplifiers makes the control take place at a frequency so close to the crossover frequency that in practice the control is assumed to take place at the crossover frequency.

It will be seen that if the solid curves in Fig. 2 represent the output of the discriminator 26 across the resistors 33 and 34 and if the tuning sweeps impressed by the tube 70 upon the local oscillator 7 in the absence of a signal are directed as shown by the arrows S and S' in Fig. 2, the switch 42 should be thrown to the left to connect with the contact 51 for operation of the apparatus of Fig. 1 with the local oscillator at a frequency lower than that of the signal received in the antenna 5, whereas for operation with the local oscillator at a frequency higher than that of the signal, the switch 42 should be thrown to the right to engage with the contact 41. This follows from the fact that a reversal of polarity takes place with each of the stages of video frequency amplification following the discriminator 26. A preferred method of selecting the polarity of the discriminator output as it is applied to the gas tube corresponding to the tube 56 of Fig. 1 is shown in the arrangement of Fig. 3 which will presently be described.

If it is not known whether the oscillator is operating at a frequency higher or lower than that of the signal received in the antenna 5, the proper setting of the switch 42 may usually be determined by observing which setting yields the stronger signal at the indicator 13. If desired, an auxiliary narrow-band intermediate frequency amplifier may be used to determine whether the signal as controlled by the frequency control system is nearer the middle or near the edge of the pass-band of the intermediate frequency amplifier, the auxiliary amplifier being so sharply tuned that substantially no response will be shown for frequencies near the edge of the pass-band of the amplifier 8 while a suitable indication may be given when the signal detected in the mixer 6 is near the center of the intermediate frequency amplifier 8. A convenient form of indication for the output of such auxiliary intermediate frequency amplifier might be provided by a circuit including a "tuning eye" vacuum tube having a small luminous screen electrode. Such elaborate arrangements are usually unnecessary, however, the operation of switch 42 by an operator of reasonable skill being generally sufficient.

Figure 3:
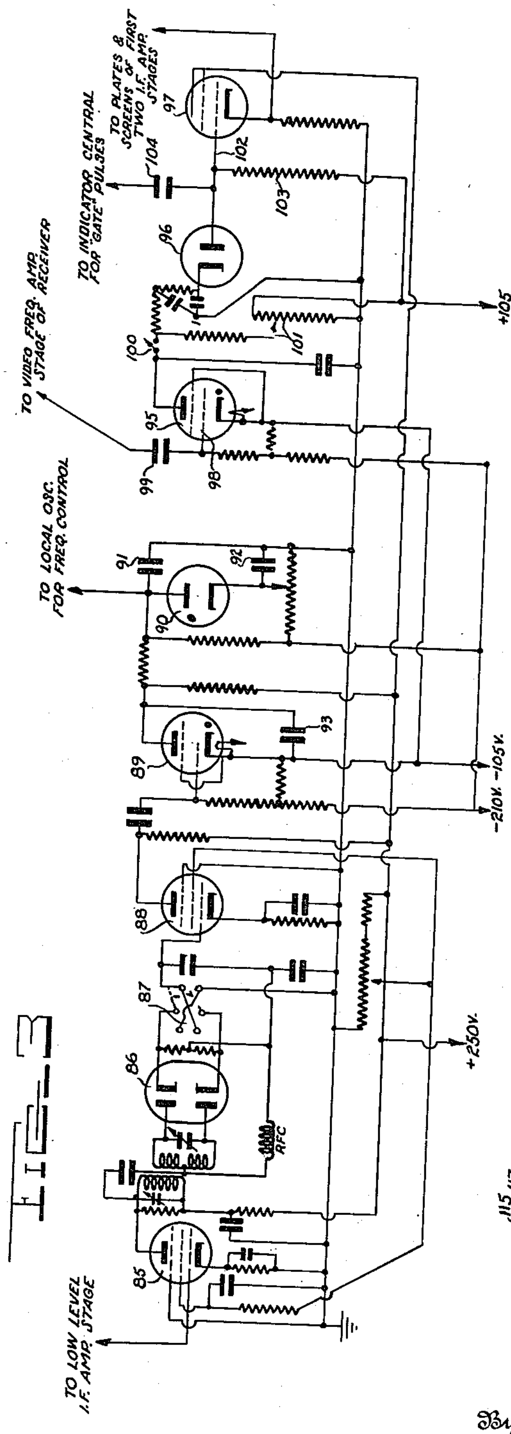
Fig. 3 shows the electrical circuit of another form of apparatus for controlling the tuning of a receiver in accordance with the present invention and also a form of apparatus suitable for automatic gain control of the said receiver.

Fig. 3 shows another form of frequency control circuit which may be used in the general type of system shown in Fig. 1 instead of the frequency control circuit there described. Fig. 3 also shows a circuit for applying automatic gain control to the receiver.

The vaccum tube 85 is connected in an amplifier circuit and corresponds to the vacuum tube 25, serving to amplify a voltage obtained from a low level stage of the intermediate frequency amplifier of the receiver and to feed it to the discriminator circuit. The discriminator circuit shown in Fig. 3 is of the same type as that shown in Fig. 1, the vacuum tube 86 corresponding to the vacuum tube 26. Control over the polarity of the discriminator output is accomplished in this case by means of a simple reversing switch 87 instead of by the insertion of an additional phase-inverting amplifier stage, as was done in Fig. 1. It is to be noted that the reversing switch 87, in order to preserve R. F. by-pass network balance, is preferably inserted between the load resistors of the tube 86 and the condensers associated with said resistors, these condensers, as in the case of the corresponding condensers 35 and 36 of Fig. 1, being of unequal sizes, both quite small. The vacuum tube 88 is connected in an amplifier circuit and provides amplification just as the vacuum tube 40 provided amplification in the circuit shown in Fig. 1. The tube 89 corresponds to the gas discharge tube 56 and is likewise a gas discharge tube. The tube 90 corresponds to the tube 70 and operates in a similar manner. The condenser 91 corresponds to the condenser 76 and the condenser 92 corresponds to the condenser 77. Instead of a condenser 68 between the anode of the tube 56 and ground, the tube 89 is provided with a condenser 93 between its anode and cathode, but the difference is not important. The arrangement shown in Fig. 3 provides a somewhat greater voltage across the condenser, so that a somewhat greater discharge is obtained for a given size of condenser.

The tubes 95, 96, and 97 are arranged in circuits adapted to provide automatic gain control for the receiver. The tube 95 is a gas discharge tube preferably of the same type as the tube 89 of Fig. 3 and the tube 56 of Fig. 2. A signal from a part of the receiver functionally located near the output thereof (on a video amplifier stage, for instance) is applied to the grid 98 of the tube 95 through a coupling condenser 99. The said signal will again be a series of short-duration pulses. Said pulses are not suitable for the operation of ordinary automatic gain control circuits, but by employing a circuit such as that shown in connection with the tube 56 of Fig. 1 and the tube 89 of Fig. 3, the series of short duration signal pulses may be made to produce a series of longer-duration disturbances in the anode circuit of tube 95 which result in substantial change of the average anode voltage. As before noted, when the short pulses gradually increase in amplitude, beginning at a low level, compared with the bias of the gas discharge tube in question, the gas tube 95 will at first fire on only a portion of the pulses, on account of normal variations in intensity of successive pulses, but a very slight further rise in average pulse intensity will result in each short pulse firing the tube 95. Such a circuit, as contrasted with one delivering a short pulse signal, is well suited for operating automatic gain control circuit. A switch 100 is provided in the plate circuit of the gas discharge tube 95 which when opened is adapted to disable the automatic gain control circuit, allowing the gain of the receiver to be adjusted by a manual control, such as that shown in Fig. 1 at 18 in association with the vacuum tubes 19 and 20. The manual control in Fig. 3 is shown by the potentiometer 101. When the switch 100 is closed the output of the gas discharge tube 95 modifies the bias of the diode 96 thereby modifying the bias of the control grid 102 of the tube 97, the grid resistor 103 having a high resistance, such as about 10 megohms. The diode 96 corresponds to the diode 19 and the vacuum tube 97 and its associated cathode follower circuit corresponds to the tube 20 of Fig. 1 and its associated circuit. As in the case of the circuits associated with the tubes 19 and 20, gate pulses may be introduced to the grid 102 of the tube 97 through the coupling condenser 104, thus causing the receiver to be energized for the amplification of signals only during the desired portion of the transmitter duty cycle (i. e. between pulses).

The provision of automatic gain control is of extreme importance in the case of high-precision direction-finding equipment of the type used for directing guns. In such apparatus the antenna system is oscillated or rotated in such a manner that the echo signal is modulated at a frequency corresponding to that of modulation or rotation. The phase of this modulation, which modulation may be referred to as the "error signal," indicates the direction in which the antenna system should be moved in order to track the target. In order that the modulation may effectively be furnished to suitable phase-detecting circuits, the receiver gain must be controlled so that in the amplifying channel in which the modulated signal is amplified the modulation will not be distorted or removed as a result of the signal becoming so strong in some stages of amplification that a limiting effect sets in, or by the signal becoming so weak that the modulation is distorted by noise. The gain control action, however, should be slow enough in action that it will not wash out the modulation of the signal of which it is desired to provide to the phase-detecting circuit. A suitable time-constant for the automatic gain control action may be provided by adjustment of the values of resistors and condensers in accordance with well-known principles.

For the purpose of direction finding systems of the type just discussed it is also important that a "gate" circuit be used for signal selection, so that only the amplitude of the signal which it is desired to track will affect the control of the gain of the receiver. As above mentioned, the gate pulses for this purpose may be introduced to the grid 102 of the tube 97 through the coupling condenser 104. When the gate is properly adjusted in time, the amplification stages of the receiver will be operated when the desired echo signal is expected, but not at other times when interfering signals might be received. Since the output of the receiver, thus controlled by the "gate," is furnished through the condenser 99 for the operation of the gain-control circuits, interfering signals are practically unable to interfere with the proper control of the gain of the receiver. If desired, gate pulses, instead of being applied to the condenser 104, may be applied to the anode of the tube 95 or to the suppressor grid (not shown) thereof. In such case the gain control circuits will be inoperative except during the time when the desired signal is expected and the effect of interfering signals will be substantially excluded. The amplifying stages of the receiver will be operative all the time, but in apparatus of the type under discussion the phase-detection circuits and associated circuits themselves are usually capable of providing the equivalent of a target-selection effect. The provision of the gate pulses to the tube 95, however, assures that the gain control will be operated by the desired signal only.

Fig. 4 shows still another form of frequency-control apparatus in accordance with the present invention. The circuit of Fig. 4 provides not only for maintaining the receiver in tune with a transmitted signal so that echoes of the transmitted signal may be picked up in the receiver but also for automatically maintaining the tuning at a desired spot frequency when such tuning is desired. Spot frequency tuning may be desired in connection with beacon transmitter signals transmitted on particular frequencies, which signals it may be desired to pick up from a mobile craft equipped with radio-echo location equipment on the receiver associated with such equipment.

The input end of the frequency control circuit shown in Fig. 4 is provided with a separate coupling arrangement, comprising the coupled coils 110 and 111, the variable inductance 112 and the resistance capacitance filter including the condenser 113, which preferably has a value of about .001 micro-micro-farad and the resistor 114, which preferably has a value of about 100 ohms, for connection to a low impedance cable 115 having an inner conductor 116 and a grounded outer conductor 117. The condenser 113 and resistor 114 serve to facilitate measurement of the rectified detector current resulting from the action of the detector which may be connected to the other end of the cable 115. The cable 115 may be connected to the output of the preamplifier of the receiver, or, in a radio-echo detection system where the signal to which it is desired to tune the receiver is almost invariably locally generated, it may be connected through a coupling providing a desired amount of attenuation to a transmission line associated with the transmitter. The coupling may in this case be extremely loose and may involve a great deal of attenuation, so that other signals appearing in the said transmission line, such as received signals from interfering sources, will be so greatly attenuated as to be unable to exert any control upon the receiver tuning. The locally generated transmitter signal, however, being at a relatively high power level, will be able to operate the frequency control circuit even after considerable attenuation, such as attenuation of the order of 60 db.

The signal upon which it is desired to tune the receiver is fed to the coils 110 and then amplified by the tube 120 which corresponds to the tube 85 of Fig. 3 and the tube 25 of Fig. 1. More than one stage of amplification could be used here if desired, but ordinarily one stage of amplification will suffice. The tube 120 is coupled to a discriminator circuit including a double diode tube 121 which corresponds to the tube 26 of Fig. 1 and the tube 86 of Fig. 3. The coupling arrangement and the discriminator circuit is essentially the same as those shown in Figs. 1 and 3. It will be noted, however, that the loading resistor across the coil and condenser in the plate circuit of the tube 120 has been omitted, so that the amplifier stage is in this case somewhat more sharply tuned. In Fig. 4 the screen voltage is obtained directly from the plate supply voltage without the use of a separate series resistor.

The apparatus of Fig. 4 is designed to operate without provision for changing the polarity of the output of the discriminator, the local oscillator being designed to operate at a frequency lower than that of the transmitter signal and being constructed so that it can be effectively adjusted for such operation only. A two-position switch 122 is provided to select between the output of the discriminator circuit including the tube 121 and the output of another circuit presently to be described for adjusting the tuning of the receiver to a desired spot frequency. The voltage transmitted through the switch 122 is fed to a two-stage resistance-coupled amplifier including the double triode vacuum tube 123. As in the case of the amplifier tube 40, the cathode resistors are unbypassed. It will be noted in this connection that the cathode resistor of the tube 88 of Fig. 3 was bypassed, this matter being in effect a matter of choice. The output of the two-stage amplifier including the tube 123 is then fed to a gas discharge tube 125 which corresponds in function to the gas discharge tube 89 of Fig. 3 and the tube 56 of Fig. 1. The anode circuit condenser 126 of the discharge tube 125 is, like the condenser 93 of Fig. 3 connected directly between the anode and the cathode. The gas discharge tube connected in the circuit of Fig. 4 between the tube 125 and the local oscillator reflector terminal is in this case a triode (preferably of the 884 type) so that a negative voltage may be applied upon the grid thereof to control the operation of the tube.

In the circuit of Fig. 4 the regulated negative bias supply which is connected to the cathode then control grid of the tubes 125 and 128 has an output voltage of approximately −150 volts, regulated by the discharge tube 155 which is preferably a type VR150 tube. The resistors 130 and 131 have relatively low values, preferably about 2200 ohms, whereas the resistors 132 and 133 have relatively high values, preferably about 56,000 ohms and 100,000 ohms respectively. The resistor 134 likewise has a relatively large value, preferably about 100,000 ohms. The resistor 127 is increased to about 3.3 megohms in order that when the tube 128 becomes conducting the voltage of the plate 129, which is fed to the local oscillator reflector electrode through the resistors 135 and 136 having values of about 10,000 ohms and 1000 ohms respectively, may be a negative voltage in the range desired for operation of the local oscillator. The circuit of Fig. 4 can be made to function for various amounts of periodic variations of local oscillator frequency through the operation of the tube 128 by properly adjusting the bias of the control grid of that tube. The bias of the control grid of the tube 128 effectively adjusts the differential between the ignition and extinction voltage, which in the case of a diode is not generally adjustable, so that the circuit of Fig. 4 is more adaptable to various desired conditions.

In the circuit of Fig. 4 the resistor shown in Fig. 1 at 75 is dispensed with, partly because the plate voltage of the tube 125 is lower than the corresponding voltage in the circuits of Figs. 1 and 3 (being about 110 volts in Fig. 4) and partly because it appears safe to assume that the tube 128 will function consistently. As it was pointed out in connection with Fig. 1, the resistor 75 is a safety measure and is not otherwise necessary.

In other respects the circuits of the tubes 125 and 128 are similar to the corresponding circuits in Figs. 1 and 3. The condenser 137, which preferably has a value of about 0.5 micro-farad, is slowly discharged through the resistor 127 which has a value of about 3.3 megohms. When the anode 129 reaches a suitable voltage as the result of the gradual discharging of the condenser 137, the tube 128 is ignited and the anode falls relatively rapidly to a voltage differing only by the extinction potential of the tube from the cathode voltage (which is about 150 volts). The resistors 131, 130 and 148 in the cathode circuit are relatively low in value, permitting relatively rapid charge of the condenser 137 with the negative potential in question. When the condenser is charged, the voltage across the tube falls and the tube is extinguished, and the condenser again begins to discharge slowly from a negative value toward a more positive value through the resistor 127.

The grid of the tube 128 is maintained at a substantially fixed negative voltage with respect to the cathode of said tube by connection to the regulated negative voltage supply through the resistor 134, of a value of about 100,000 ohms, the connection being made on the negative side of the resistor 130, which with the resistors 131 and 132 provides the desired voltage drop. The grid circuit resistors are preferably by-passed by the condenser 138, which has a value of about .01 micro-farad.

The oscillations of the tube 128 are interrupted by operation of the tube 125 upon the reception of a suitable signal in the manner explained in connection with Fig. 1. The condenser 126, like the condenser 68, preferably has a value of about .01 micro-farad and the resistor 126a, like the resistor 67, preferably has a value of about 500,000 ohms, in order that the pulses in the plate circuit of the tube 128, when present, may have a duration of about 30 microseconds each.

The output of the control circuit is filtered through the filter comprising the resistors 135 and 136 and the condensers 140 and 141. The condensers 140 and 141 are relatively small having a value of .001 micro-farad. The condenser 140 serves to introduce a ripple into the frequency control voltage. The apparatus of Fig. 4 is preferably used with a 400 cycle power supply feeding the primary 143 of the power transformer of the bias supply. The ripple at the input end of the bias supply filter of the half wave rectifier circuit will therefore have a frequency of about 400 cycles and this ripple will be in the form of brief momentary rises in potential from a relatively steady negative value to some more positive value, so that the local oscillator will momentarily go to a slightly lower frequency. It may be mentioned that the condensers 144 and 145 of the bias supply filter may have values respectively of 0.5 and 2 micro-farads, while the resistors 147 and 148 may have values respectively of 2000 ohms and 1000 ohms.

During operation of the frequency control circuits for maintaining the receiver tuning centered on the transmitter signal, the small variation introduced in the receiver tuning by the ripple coupled through the condenser 140 will not substantially affect the operation of the receiver. When the switch 122 is thrown to its upper position, however, the ripple performs an important function. The upper contact of the switch 122 is connected with a detector 150 preferably one of the silicon crystal type, which is coupled to a resonant cavity 151. The resonant cavity 151, which is preferably of the three-quarter wave coaxial line type, is coupled to the local oscillator output by means of a transmission line 152. The resonant cavity is tuned to a frequency slightly different than the frequency which differs by an amount approximately equal to the midband intermediate frequency of the receiver from a particular spot frequency to which it may be desired to tune the receiver. The resonant frequency of the cavity 151 is, moreover, made to be such that the desired local oscillator frequency for tuning the receiver on the said particular frequency will correspond to a point on the steep part of the resonant response curve of the cavity 151 slightly above the resonant frequency of the cavity 151. Consequently if the local oscillator frequency should fall, the detected voltage appearing at the upper contact of the switch 122 will increase, whereas if the local oscillator frequency should rise the voltage at the said contact will decrease. Sudden transient changes of the oscillator frequency to a lower frequency such as are produced by the ripple introduced to the reflector electrode voltage, will cause the voltage delivered at the upper contact of the switch 122 to take the form of intermittent pulses of varying amplitude as the oscillator frequency approaches the deeper parts of the response curve of the cavity 151. These may be amplified by the vacuum tube 123 in the same manner as the pulses produced in the output of the discriminator tube 121 and the local oscillator frequency will then be controlled to tune the receiver to the desired spot frequency which has a fixed relation to the resonant frequency of the cavity 151. It will be noted that in operation of this type, the introduction of the rectifier ripple through the condenser 140 is important, since otherwise only slow variations of D. C. potential would occur at the upper contact of the switch 122, which could not be properly amplified in the alternating current amplifier associated with the vacuum tube 123 (and would necessitate the use of a D. C. amplifier). The operation of the tube 125, moreover, requires for best results an alternating current input, in order that the control effect may be gradual, the tube at first firing on a small proportion of the input pulses and gradually increasing its average frequency of operation until it fires upon each pulse. A slowly varying direct current input would result only in a sudden change of state when a critical voltage is reached. If desired, the ripple might be introduced into the control voltage only when the switch 122 is in its upper position, in which case a larger ripple might be used, if convenient. Such ripple might be produced by a separate timing circuit instead of being obtained from the power supply, especially if the power supply is operated from a 60-cycle source instead of a 400-cycle source.

It will be seen from the arrangement of the cavity 151 and its associated apparatus that the off-resonance response characteristic of a sharply tuned circuit might be used instead of the discriminator circuit associated with the tube 121 for causing the input to the tube 125 to vary in amplitude with changes in frequency of the signal being amplified. Such a circuit is generally known as a "slope filter." It has been found that the Foster-Seeley type of discriminator circuit is somewhat more reliable in operation than the simple parallel-resonant slope filter circuit and the latter is therefore not preferred for control of the receiver tuning with respect to the locally generated signal of the transmitter. If used, the slope filter circuit should be operated on the low frequency side of the slope filter in cases where the tube 128 shifts typical I. F. signals slowly to higher frequencies and more rapidly toward low frequencies. In a circuit in which the tube 128 should shift the I. F. signals alternately slowly to low frequencies then rapidly toward higher frequency, the slope filter should be operated upon its high frequency side. Such operation would correspond to operation upon the high frequency side of a discriminator circuit characteristic with an appropriate choice of the polarity of the discriminator input. Slope filters, discriminators and the like may as a group be referred to as "filter circuits."

An important advantage of the Foster-Seeley discriminator circuit over the simple parallel-resonant circuit as a frequency discriminator lies in the fact that the former gives substantially zero output when subjected to a signal including components of approximately equal intensity of many different frequencies scattered at random, even if all of these components have fairly high intensities, whereas a simple parallel-resonant circuit shows a tendency to be shock-excited by off-frequency signals when the latter are sufficiently intense. This is particularly important for radio-locating equipment in which it is desired to control the frequency of the receiver by a suitable small portion of the transmitter output rather than by the frequency of received echoes, in order to avoid the possibility of interference by other radio-echo locating equipment in the vicinity, or the like. The receiver will normally respond at the moment of transmission as a result of a small amount of the transmitter power reaching the receiver in spite of the various protective devices provided to shield the receiver from the direct action of the transmitter. The corresponding signal is generally known as the "main bang" or "main pulse," as distinguished from the echo signal, and the tuning control circuit may, by a suitable gating arrangement, be caused to respond only to this "main bang" and not to any signals received while the transmitter is not in operation. Other ways may also be devised for causing the tuning-control circuit to respond only to a signal produced by the transmitter and not to echo signals. The "main bang" signal usually observed in the receiver has a fairly broad frequency spectrum and has a relatively large intensity, so that it is generally not practical to employ, as a frequency-discriminating circuit, an ordinary parallel-resonant circuit, which is very likely to become shock-excited on such signals when the receiver is appreciably off tune. In this type of operation the Foster-Seeley discriminator circuit gives better results.

The length of time which the tube 125 remains conducting after being fired by a short pulse on its grid may be controlled in various ways. Instead of being controlled by capacitance and resistance in the plate circuit of the tube 125, the said time period might be controlled by applying the plate voltage to the tube 125 only for a predetermined period beginning at the time of the pulse on the grid and continuing for a predetermined time thereafter, said time being controlled by a gate circuit in the indicator central. Control of this time period by means of a gate circuit results in greater consistency and accuracy of the duration of the conducting condition in the tube 125. In the circuit in question, however, accuracy of timing is not important, provided that a consistent average is maintained over a reasonable number of pulses, so that the simpler self-timed circuit above described employing a condenser in the anode circuit is to be preferred.

It is to be understood that frequency-control voltages such as those produced by the arrangements herein described may be used for frequency control by means other than the variation of the voltage of an electrode of a local oscillator tube. The control voltage could, for instance, be employed to operate an electromechanical tuning mechanism. In such case it may be desirable to further amplify said control voltage by suitable amplifier circuits. The electrode voltage method of control is preferred because of its great convenience.

What I desire to claim and secure by Letters Patent is:

1. Automatic electrical frequency control apparatus comprising an adjustable source of recurrent pulses of variable frequency oscillations separated by time intervals of duration different from the duration of said pulses, discriminator means coupled to said source to derive output potential pulses of polarity and magnitude respectively dependent on the direction and extent of variation of the frequency of said oscillations from a predetermined frequency, a detector coupled to said discriminator means to receive said output potential pulses and to produce a direct-current output signal dependent on the alternating components of said pulses, and means responsive to said direct-current output signal and operatively coupled to said source for adjusting the frequency of oscillation of said source in a direction to reduce said variation from said predetermined frequency.

2. Automatic electrical frequency control apparatus comprising an adjustable source of recurrent pulses of variable frequency oscillations separated by time intervals of duration different from the duration of said pulses, discriminator means coupled to said source to derive output potential pulses of polarity and magnitude respectively dependent on the direction and extent of variation of the frequency of said oscillations from a predetermined frequency, means coupled to said discriminator means to receive said output potential pulses and to produce a pair of direct-current output signals each dependent on the amplitude of said pulses, means selecting one of said pair of direct-current signals and means responsive to said selected direct-current output signal and operatively coupled to said source for adjusting the frequency of oscillation of said source in a direction as selected to reduce said variation from said predetermined frequency.

3. In a circuit including an oscillator, the frequency of said oscillator being controlled by a frequency governing electrode, said circuit providing signals having a carrier frequency dependent on the frequency of said oscillator, a control circuit for controlling the frequency of said oscillator, said control circuit comprising, a first and a second potential source, a potential divider having one end terminal thereof connected to said first potential source and a second end terminal connected to said second potential source, a capacitor having one terminal thereof connected to a point of fixed reference potential and a second terminal thereof connected to an intermediate terminal of said potential divider and to said frequency governing electrode, and means responsive to said pulse signals controlling the average potential of said first source in accordance with the carrier frequency of said signals.

4. Apparatus for automatic control of a radio receiver during the reception of short-duration pulses which includes detector means coupled to said receiver providing an output signal proportional in amplitude to the frequency of the input signal to said detector means and having a duration equal to the duration of said pulses, pulse stretcher means coupled to said detector means producing pulses of a duration long compared to said short-duration pulses in response to signals from said detector means which exceed a predetermined amplitude, and means coupling the output of said pulse stretcher means to said receiver.

5. Apparatus for automatic control of a local oscillator of a receiver during the reception of short-duration pulses which includes detector means coupled to said receiver providing an output signal proportional in amplitude to the frequency of the input signal to said detector means and having a duration equal to the duration of said input pulse signal, pulse stretcher means coupled to said detector means producing pulses of a duration long compared to said short-duration pulses in response to signals from said detector means which exceed a predetermined amplitude, and means coupling the output of said pulse stretcher means to said local oscillator of said receiver to control the frequency thereof.

6. Apparatus for automatic control of a radio receiver during the reception of short-duration pulses comprising detector means coupled to said receiver and providing a pulse signal, the amplitude of which is proportional to the carrier frequency of said pulses, pulse stretcher means coupled to said detector means generating a signal extending in duration for the interval between successive pulses in response to pulse signals from said detector means which exceed a predetermined amplitude, integrating means providing a signal proportional to the time average of said generated signals, said average being taken over a period long compared to the time intervals between successive receptions of said short-duration pulses, and means coupling said average signal to said receiver.

7. Apparatus for automatic control of a local oscillator of a radio receiver during the reception of short-duration pulses comprising detector means coupled to said receiver and providing a pulse signal, the amplitude of which is proportional to the carrier frequency of pulses applied to said detector means, signal generating means coupled to said detector means and generating a signal in response to pulse signals from said detector means which exceed a predetermined amplitude, means responsive to said generating means signal extending said signal for the interval between successive pulses integrating means responsive to said extended signal and providing a signal proportional to the time average of said generated signals, said average being taken over a period long compared to the time intervals between successive receptions of said short-duration pulses, and means coupling said average signal to the local oscillator of said receiver.

8. In apparatus for automatic control of the tuning of a radio receiver having a local oscillator, the frequency of said local oscillator being controlled by a frequency governing electrode, the combination comprising, a discriminator circuit coupled to the intermediate frequency section of said receiver and providing signals having an amplitude indicative of the frequency of signals coupled to the input of said discriminator, a first capacitor having one terminal thereof connected to a point of fixed reference potential and a second terminal thereof returned to a positive voltage through a first resistor, the time constant of said resistor capacitor circuit being at least as great as the time spacing between successive signals in the output of said discriminator, a gas discharge tube having an anode, a cathode, and a control grid, the anode of said discharge device being connected to said second terminal of said first capacitor, said cathode being coupled to said first terminal of said capacitor, means coupling said grid to the output of said discriminator whereby signals from said discriminator exceeding a predetermined value trigger said gas discharge tube, thereby discharging said capacitor, a second capacitor having one terminal thereof connected to a point of fixed reference potential and a second terminal thereof connected to a point of negative potential through a second resistor, the time constant of said last-mentioned resistor-capacitor combination being long compared to the time spacing between successive signals in the output of said discriminator, a third resistor means coupling said second terminal of said first capacitor to said second terminal of said second capacitor and means coupling said second terminal of said second capacitor to said frequency governing electrode.

9. The combination of claim 8, said combination further comprising a second discharge device coupled in shunt with said second capacitor, said second discharge device being adapted to discharge said second capacitor when the potential thereacross exceeds a preselected value.

10. The combination of claim 8, said combination further comprising a second discharge device coupled in shunt with said second capacitor, said second discharge device being responsive to potentials across said capacitor which exceed a predeterminad value to discharge said capacitor, and means for controlling said predetermined value at which said second capacitor is discharged.

11. In a circuit including an oscillator, the frequency of said oscillator being controlled by the potential on a frequency governing electrode, said circuit providing pulse signals having a carrier frequency dependent on the frequency of said oscillator, means for controlling the frequency of said oscillator comprising a discriminator circuit having as an input thereto said pulses from said circuit and providing signals having an amplitude indicative of the carrier frequency of said pulses, a first capacitor having one terminal thereof connected to a point of first potential and a second terminal thereof connected to a point of second potential different from said first potential through a first resistor, a first switch means connected in shunt with said first capacitor, said first switch means being responsive to signals from said discriminator means which exceed a predetermined value to discharge said first capacitor, a second capacitor having a first terminal thereof connected to a point of third potential and a second terminal thereof connected to a point of fourth potential different from said third potential, through a second resistor, the time constant of said last-mentioned resistor-capacitor circuit being long compared to the time spacing between successive signals in the output of said discriminator, third resistor means connecting said second terminal of said first capacitor to said second terminal of said second capacitor, and means coupling said second terminal of said second capacitor to said frequency governing electrode of said oscillator.

12. Frequency controlling means as in claim 11, said controlling means further comprising second switch means in shunt with said second capacitor, said second switch means being responsive to potentials across said capacitor exceeding a predetermined value for discharging said capacitor.

13. In an apparatus for automatic control of the tuning of a radar receiver to a signal, the combination of a frequency sensitive discriminator circuit adapted to provide increasing amplitude output as the frequency of said signal is varied in one direction within a predetermined range, a first condenser, means for charging said condenser, means responsive to said output of said discriminator circuit to discharge said first condenser upon the attainment by said output of an amplitude exceeding a predetermined value, a second condenser coupled to said first condenser through a resistor and arranged to be charged to a potential dependent upon the average potential appearing across said first condenser, and means including a discharge device to prevent the potential across said second capacitor from exceeding a predetermined value.

14. In apparatus for automatic control of the tuning of a radio receiver having a local oscillator, the frequency of said local oscillator being controlled by a frequency governing electrode, the combination comprising, a frequency sensitive filter circuit coupled to the intermediate frequency section of said receiver and providing signals having an amplitude indicative of the frequency of signals coupled to the input of said filter circuit, a capacitor and a resistor serially connected between two points of different potential, the time constant of said resistor-capacitor circuit being at least as great as the time interval between successive signals in the output of said frequency sensitive filter circuit, a gas discharge tube having an anode, a cathode and a control grid, the anode-cathode circuit of said discharge tube being connected in shunt with said capacitor, means coupling said grid to the output of said frequency sensitive filter circuit whereby signals from said circuit exceeding a predetermined value trigger said gas discharge tube thereby discharging said capacitor, a second capacitor coupled to said first capacitor through a resistor and arranged to be charged to a potential dependent upon the average potential appearing across said first capacitor, and means coupled between said local oscillator and said second capacitor for applying potential of said second capacitor to said frequency governing electrode.

15. In apparatus for automatic control of the tuning of a radio receiver having a local oscillator, the frequency of said local oscillator being controlled by a frequency governing electrode, the combination comprising, a frequency sensitive filter circuit coupled to the intermediate frequency section of said receiver and providing signals having an amplitude dependent upon the frequency of signals coupled to the input of said frequency sensitive filter circuit, a first capacitor and a first resistor serially connected between two points of different potential, the time constant of said resistor-capacitor circuit being at least as great as the time spacing between successive signals in the output of said frequency sensitive filter circuit, a gas discharge tube having an anode, a cathode and a control grid, the anode-cathode circuit of said discharge device being connected in shunt with said first capacitor, means coupling said grid to the output of said frequency sensitive filter circuit whereby signals from said circuit exceeding a predetermined value trigger said gas discharge tube thereby discharging said first capacitor, a second resistor and a second capacitor serially connected between two points of different potential, the time constant of said last-mentioned resistor-capacitor combination being long compared to the time spacing between successive signals in the output of said frequency sensitive filter circuit, a third resistor coupling the junction of said first resistor and said first capacitor to the junction of said second resistor and said second capacitor, and means coupling said junction of said second resistor and said second capacitor to said frequency governing electrode.

16. Automatic frequency control apparatus for a variable frequency device comprising variably energizable tuning means for said device, means for positively cyclically varying energization of said tuning means for positively cyclically varying the operating frequency of said device over a predetermined band, means producing a signal corresponding in magnitude and in sense to variation of said operating frequency from a desired frequency condition, and means responsive to said signal for both controlling said cyclical variation and maintaining said operating frequency substantially at said desired frequency condition.

17. Automatic frequency control apparatus for a variable frequency device comprising reversible control means for cyclically varying the operating frequency of said device, means for producing a signal representing variation of said operating frequency from a desired frequency condition, said signal comprising a succession of electrical pulses, and means responsive to said electrical pulses to produce a pair of direct current output signals each dependent on the amplitude of said electrical pulses, means selecting one of said pair of direct current signals, and means responsive to said selected direct current output signal and operatively coupled to said variable frequency device for adjusting the frequency of oscillation thereof in a direction as selected to reduce said variation from said desired frequency.

18. Automatic frequency control apparatus for a high frequency device comprising means for cyclically varying the operating frequency of said device over a predetermined frequency band, means for producing a signal having polarity and magnitude respectively representing the sense and magnitude of variation of said operating frequency from a desired frequency condition, means responsive to said signal to produce a pair of direct current output signals each dependent on the amplitude of said signal, means selecting one of said pair of direct current signals, and means responsive to said selected direct current output signal for controlling said cyclic variation of said variable frequency device and adjusting the frequency of oscillation thereof in a direction as selected to reduce said variation from said desired frequency.

19. The apparatus defined in claim 16, including means combining the outputs of said signal responsive means and said frequency varying means for exercising said frequency control.

20. The automatic frequency control apparatus defined in claim 16, wherein said signal is pulsed.

21. Automatic frequency control apparatus for a high frequency device comprising means for tuning said device, scanning control means having a cyclically varying output, means for producing a control signal having variable magnitude and reversible polarity respectively representing deviation in magnitude and sense of the operating frequency of said device from a desired frequency, and means jointly responsive to said control signal and said cyclically varying output for maintaining said operating frequency substantially at said desired frequency.

22. Automatic frequency control apparatus for maintaining a substantially fixed frequency difference between two high frequency sources comprising discriminator means responsive to said frequency difference and providing an output proportional to and sensed in accordance with deviation of said frequency difference from said fixed value, scanning means having a cyclically varying output and tuning means for one of said sources jointly responsive to said outputs.

23. Automatic frequency control apparatus for a frequency-variable device comprising frequency regulation means, scanning means having a variable output voltage oscillating at a predetermined period for cyclically actuating said frequency regulation means to vary the frequency of said device through a predetermined band, means responsive to departure of said device frequency from a desired frequency condition for providing a reversible-polarity control signal for controlling said frequency regulation means, means selecting one polarity of said control signal and means responsive to said selected polarity of said control signal for substantially decreasing the period of said variable output voltage and of said cyclic frequency variation of said device.

24. Apparatus for automatically maintaining a high frequency device substantially at a desired frequency comprising means for tuning said apparatus, means connected for controlling said tuning means for cyclically varying the operating frequency of said device over a predetermined frequency range, and means responsive to the output frequency of said device for reversing the frequency control action of said control means to maintain said output frequency substantially at said desired frequency.

HERBERT G. WEISS.

References Cited in the file of this patent

UNITED STATES PATENTS

| Number | Name | Date |
|---|---|---|
| 1,933,219 | Nakajima et al. | Oct. 31, 1933 |
| 2,106,776 | Trevor et al. | Feb. 1, 1938 |
| 2,107,410 | Dreyer | Feb. 8, 1938 |
| 2,111,589 | Holst | Mar. 22, 1938 |
| 2,128,993 | Farnham | Sept. 6, 1938 |
| 2,190,552 | Swart | Feb. 13, 1940 |
| 2,230,588 | Cutting | Feb. 4, 1941 |
| 2,232,390 | Katzin | Feb. 18, 1941 |
| 2,245,710 | Rado | June 17, 1941 |
| 2,266,401 | Reeves | Dec. 16, 1941 |
| 2,266,516 | Russell | Dec. 16, 1941 |
| 2,272,998 | Bjornson | Feb. 10, 1942 |
| 2,282,182 | Gulliksen | May 5, 1942 |
| 2,287,925 | White | June 30, 1942 |
| 2,329,137 | Richards | Sept. 7, 1943 |
| 2,381,928 | Roberts | Aug. 14, 1945 |
| 2,404,568 | Dow | July 23, 1946 |
| 2,425,013 | Stotz | Aug. 5, 1947 |
| 2,434,293 | Stearns | Jan. 13, 1948 |